Nov. 29, 1966 P. S. FUSS 3,289,014

DIGITAL TIME COMPRESSOR WITH SELF-BIASED THRESHOLD

Original Filed July 20, 1964 3 Sheets-Sheet 1

INVENTOR
P. S. FUSS
BY
Charles Scott Phelan
ATTORNEY

Nov. 29, 1966 P. S. FUSS 3,289,014

DIGITAL TIME COMPRESSOR WITH SELF-BIASED THRESHOLD

Original Filed July 20, 1964 3 Sheets-Sheet 2

DIGITAL TIME COMPRESSOR WITH SELF-BIASED THRESHOLD

Original Filed July 20, 1964

3 Sheets-Sheet 3

United States Patent Office 3,289,014

Patented Nov. 29, 1966

3,289,014

DIGITAL TIME COMPRESSOR WITH SELF-BIASED THRESHOLD

Peter S. Fuss, Randolph Township, Morris County, N.J., assignor to Bell Telephone Laboratories, Incorporated, New York, N.Y., a corporation of New York Original application July 20, 1964, Ser. No. 383,995. Divided and this application Dec. 16, 1965, Ser. No. 518,513

7 Claims. (Cl. 307—88.5)

The present application is a division of my copending application, Serial No. 383,995, filed July 20, 1964, and entitled, "Self-Biased Threshold Circuit." This invention relates to a delay line time compressor, hereinafter called "deltic." More particularly, the invention relates to such a circuit which includes a self-biased threshold circuit for stabilizing the amplitudes and occurrence times of pulses therein.

In deltic loops a low frequency input signal pulse wave is sampled, and the samples are applied by clocked circuits to the input transducer of a suitable delay line storage medium. Pulses at the output transducer of the medium are amplified and returned to the delay input, and on each trip through the loop each pulse is reshaped and reclocked to place it in synchronism with deltic loop clock control signals which occur at a rate that is much higher than the input signal sampling rate. Samples are thus circulated in the loop at a bit rate which is much higher than the bit rate of the incoming signals so that real time operations can be performed on the signal samples. Within the deltic loop, the sample pulse regeneration and retiming prevent substantial deterioration of the signal samples as a result of repeated transmissions through the delay medium. However, the reclocking operations require input pulses which are stable in configuration and occurrence time, particularly at high bit rates in the deltic loop. If circulating pulses are permitted to vary significantly in amplitude and occurrence time, the margin of tolerable signal misalignment for the reclocking operation is significantly reduced; and a bit may be lost while in the loop.

The prior art has endeavored to meet the deltic pulse stability requirements by employing at the output of the delay medium an amplifier with automatic gain control to help stabilize the amplitudes of the circulating pulses. All automatic gain control circuits require a substantial expenditure in circuit parts and also require relatively frequent maintenance adjustments. In addition, as the bit rates at which the deltic circuits are to operate increase, the requirements for circuit parts and maintenance adjustments become more severe. For this reason one of the principal factors restricting the upper bit rate limit for prior art deltic circuits has been the automatic gain control circuits.

These prior art circuits also employ some form of fixed voltage threshold device to clip off and discard the lower amplitude portions of the circulating pulses in order to exclude noise signal skirts which are usually present at such lower amplitudes. The threshold devices normally employed in prior art deltic circuits have a significant temperature sensitivity which causes their operating threshold to vary substantially with variations in ambient temperature. It is difficult to compensate such threshold devices directly for this type of variations in characteristic. It is also difficult to perform indirect compensation by causing the automatic gain control function of the amplifier to be automatically varied in step with changes in the threshold device characteristic.

Accordingly, it is one object of the present invention to simplify deltic circuits.

Another object is to stabilize the amplitude and occurrence times of pulses circulating in deltic loops.

A further object is to reduce time jitter in deltic circuits.

These and other objects of the invention are achieved by incorporating in a deltic system a self-biased threshold circuit which is adapted to base-clip signal pulses at a clipping threshold that varies with variations in the input signal level to the circuit to reject noise below such threshold. The threshold circuit is also adapted to limit the pulse portion utilized after clipping to a substantially uniform amplitude.

It is one feature of the invention that the pulse stabilizing circuits are relatively simple and insensitive to changes in atmospheric conditions and component tolerances.

A further advantage of the invention is that the threshold circuit stabilizes the amplitude and occurrence time of input pulses to retiming circuits of the deltic loop so that the margin of jitter-free operation of the loop is improved.

It is another feature of the invention that deltic circuits incorporating a self-biased threshold circuit are useful in a variety of field applications in which such circuits are subjected to a significantly wider range of temperature variation than was heretofore possible.

An additional feature of the invention is that the complexity of the threshold circuit which performs pulse stabilization in a deltic loop of the invention is relatively independent of the loop bit rate and of the number of amplification stages required in the deltic loop.

Still another feature is that input pulses to be time compressed and deltic control pulses are circulated in separate channels of a common delay medium to improve the jitter-free operation of the deltic.

A complete understanding of the invention and its various features, objects, and advantages, may be obtained from a consideration of the following detailed description, and the appended claims, in connection with the attached drawing in which:

Figure 1:
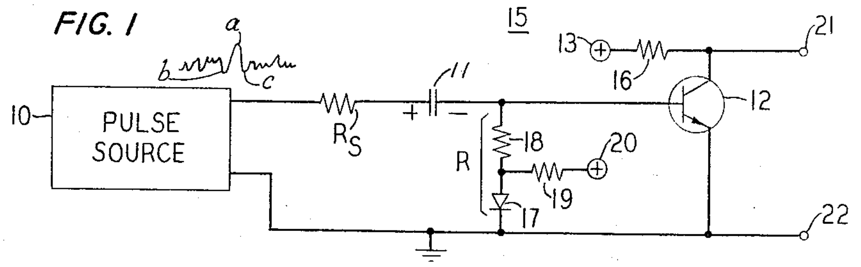
FIG. 1 is a schematic diagram of a self-biased threshold circuit utilized in the invention.
Figure 2:
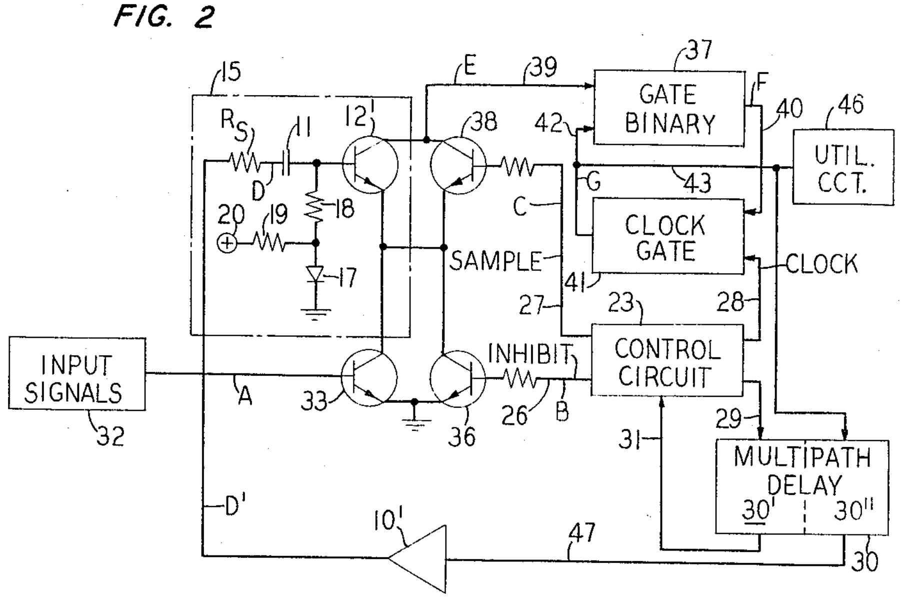
FIG. 2 is a diagram partly in schematic form and partly in block and line form of a delay line time compressor circuit employing the invention.

FIGS. 3A through 3G, 4A, 4B, 5A, and 5B include wave diagrams illustrating the operation of the circuits of FIGS. 1 and 2.

The self-biased threshold circuit of FIG. 1 is disclosed and claimed in my aforementioned threshold circuit application and is a circuit which is designed to stabilize the amplitude and occurrence time of pulses coupled thereby from a pulse source 10 to an output circuit. Positive-going pulses from source 10 may vary in amplitude, causing a change in leading edge slope; but otherwise they have substantially uniform configuration. Many of these pulses in a practical system also have noise skirts associated therewith as indicated in exaggerated form by the pulse wave shown adjacent to source 10. The pulse itself, apart from noise skirts, has a principal positive peak *a* between two smaller negative peaks *b* and *c*. This is sometimes called a tripolar pulse and is characteristic of pulses emitted by certain broadband video delay means in response to the insertion therein of a simple rectangular pulse having a direct component that is not transmitted by the delay means. The pulse peak *a* corresponds, of course, to the rectified envelope of a radio frequency burst of energy produced by more conventional narrow band delay lines for each input pulse.

The pulses from source 10 are applied by a resistor $R_s$ and a capacitor 11 to the base electrode of a transistor 12. The resistor $R_s$ is a schematic representation of the internal resistance of the pulse source 10. Other operating potentials are applied to transistor 12 by potential source 13 and a resistor 16. The source 13 is schematically represented by a circled plus sign to indicate any suitable source of direct potential having its positive terminal connected to the circuit where the circled plus sign is shown, and having a negative terminal grounded. This same convention is used throughout the present description for potential sources.

The initial positive-going pulses from source 10 forward bias the base-emitter junction of transistor 12 to cause conduction therein, and the transistor base current charges capacitor 11. The charge current tends to develop a charge voltage with the polarity indicated in FIG. 1. Each time the pulse potential from source 10 decays to a point at which it has a lower magnitude than the charge potential on capacitor 11, the transistor 12 lapses into a nonconducting condition. In the interval when transistor 12 is nonconducting between pulses from source 10, capacitor 11 partially discharges through resistor $R_S$, the forward conduction impedance of a diode 17, and a resistor 18. Diode 17 is maintained in a forward conducting condition by connection through a resistor 19 to a positive potential source 20. The sum of the forward conducting impedance of diode 17 and of the resistance of resistor 18 is indicated by reference character R in FIG. 1. Diode 17 permits reverse current components to flow in the shunt branch up to the current-supplying capacity of source 20. The presence of diode 17 in the shunt branch offsets the effect of the base-emitter junction drop in transistor 12. In other words, the potential difference developed across diode 17 tends to forward bias the transistor 12 toward conduction, and such bias tracks temperature changes in step with corresponding changes in the turn-on characteristic of transistor 12.

The resistance R is proportioned in relation to the resistance of resistor $R_S$, the capacitance of capacitor 11, and the duty cycle of output pulses from source 10 so that a substantial proportion of the charge accumulated on capacitor 11 during a pulse is dissipated before the occurrence of the next succeeding pulse. However, resistance R also has a further limitation imposed. The time constant of the discharge circuit through resistance R must be such that, during the longest anticipated discharge interval between trains of successive pulses from source 10, the charge potential ultimately remaining on capacitor 11 must be of such polarity and magnitude that together with any direct-current component of the pulse trains from source 10, it is unable to bias transistor 12 into conduction. The circuit of FIG. 1 is herein described in terms of positive input pulses that are large with respect to the base-emitter voltage required to turn transistor 12 on, and such pulses leave a correspondingly large charge on capacitor 11 with the polarity indicated in FIG. 1. However, there are other possible arrangements. For example, positive input pulses that are small with respect to the base-emitter voltage required to turn transistor 12 on operate with a small remanent charge on capacitor 11 that has a polarity the reverse of that illustrated but of insufficient amplitude alone to actuate transistor 12. In either case, the charge left on capacitor 11 between pulses, or between pulse trains, must be insufficient to cooperate with the direct-current component of signals from source 10 to turn transistor 12 on.

In the case where large positive signals are provided by source 10, variations in the base-emitter turn-on potential of transistor 12, resulting from ambient conditions or other factors, will have negligible practical effect upon the time at which transistor 12 is biased into conduction in relation to the time base of pulses from source 10. However, even where small input signals are provided, the circuit operates inherently to actuate transistor 12 at a stable time in relation to such time base as will be subsequently described.

The bias and operating circuits coupled to transistor 12 are so arranged that when the forward biasing potential from source 10 does bias transistor 12 into conduction, the transistor operates in a saturated conduction condition to function as a limiter. Thus, each output pulse appearing at the terminals 21 and 22 connected to the collector and emitter electrodes, respectively, of transistor 12 is of substantially the same magnitude as every other pulse appearing at those output terminals.

It can be shown by well known circuit analysis techniques that the amplitude proportion of each pulse from source 10 during which transistor 12 conducts is a function of the duty cycle of source 10, and the proportion is also approximately a function of the ratio $$\frac{R_s}{R_s+R}$$

The duty cycle for the wave of pulses from source 10 is constant, and the waveshape of individual pulses from source 10 is also uniform. The resistance ratio is advantageously proportioned with respect to the capacitance of capacitor 11 in one embodiment so that the time constant of the discharge circuit of the capacitor is much greater than the time interval between two successive pulses from source 10. That time constant is also greater than the longest anticipated intervals of successive pulses or of no pulses. Such intervals would correspond in a binary-coded signal wave to a train of successive ONES or an interval of successive ZEROS, respectively. Typically the time constant is made about five times greater than such longest interval. Usually the ratio $$\frac{R_s}{R_s+R}$$

is advantageously set so that transistor 12 conducts during approximately the top one-third to one-half of each pulse source 10. Thus, in a practical system the lower magnitude portion of each such pulse, which in such system is likely to have significant noise skirts associated therewith, is excluded from the base electrode of transistor 12. This type of control of the conducting interval of the transistor, in which control is exerted by passive resistance and capacitance elements, is easily adapted to frequency ranges which are much higher than those for which automatic gain control circuits for amplifiers can be easily and economically provided.

It will be hereinafter shown in greater detail that triggering of the transistor 12 in the circuit of FIG. 1 always occurs at approximately the same point in the time interval of each pulse from source 10 regardless of long time amplitude variations in the pulses from that source. The reason for this is that the ratio $$\frac{R_s}{R_s+R}$$

represents a signal amplitude percentage determining factor for input waves with a constant duty factor and pulse waveshape. Thus, if the elements $R_S$ and R are proportioned to permit transistor 12 to conduct during the upper one-third of the amplitude of incoming pulses, the triggering time of transistor 12 remains substantially constant because the input pulses attain the seventy percent point of their final amplitude level at approximately the same time regardless of long time variations in the peak pulse amplitude.

FIG. 2 illustrates a deltic loop circuit utilizing the self-biased threshold circuit of FIG. 1. Deltic circuits are known in the art as has been hereinbefore outlined. Accordingly, details of uses of such circuits and of all of the elements of the illustrated circuit, will be considered herein only insofar as necessary to demonstrate the unique advantages of employing a threshold circuit such as the circuit illustrated in FIG. 1 in a deltic loop. Circuit elements in FIG. 2 which are the same as, or similar to, elements shown in FIG. 1 are designated by the same or similar reference characters.

Figure 2A:
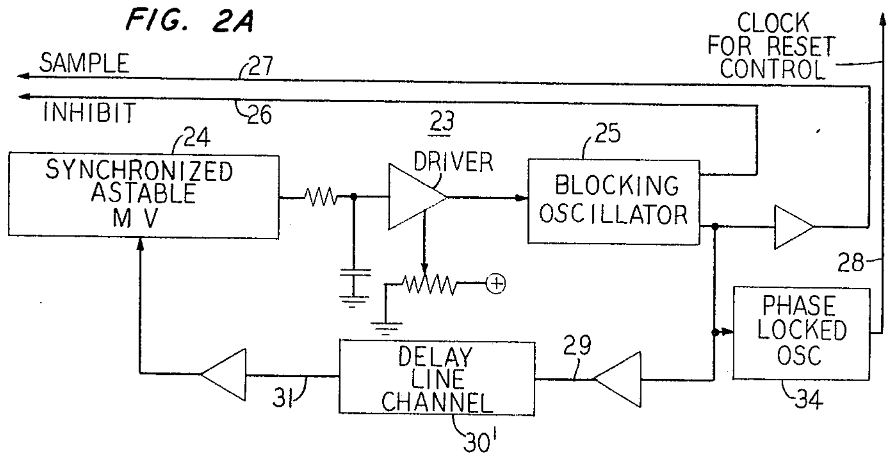
FIG. 2A is a block and line diagram of a part of the circuit of FIG. 2.

In FIG. 2 a control circuit 23 provides the signals required to control the operation of the deltic loop. There are many suitable control circuit arrangements for producing the necessary clock, sampling, and inhibiting pulses; and one example is shown in FIG. 2A. A synchronized astable multivibrator 24 is employed in FIG. 2A to drive a blocking oscillator 25 which has two output connections, one of which supplies negative-going inhibit pulses (FIG. 3B) on a lead 26 and the other of which is coupled through a phase inverting circuit to supply positive sampling pulses (FIG. 3C) on a lead 27. The blocking oscillator output is also employed to control a phase locked oscillator 34 operating at a much higher frequency which provides the clock pulses on a lead 28. The same blocking oscillator output pulses which control such phase locked oscillator 34 are applied by a lead 29 to the input of one path 30' of a multipath video delay medium 30 shown in FIG. 2. The output of that path is coupled by a lead 31 back to the multivibrator 24 for synchronization purposes.

Input signals from a source 32 in FIG. 2 are applied to the base electrode of a transistor 33 which, together with a transistor 36, comprises a NOR logic gate. Connected in series with the NOR gate of transistors 33 and 36, between ground and the setting input of a gate binary circuit 37, is another NOR gate including the transistors 12' and 38. The gate binary is advantageously a bistable multivibrator. Transistor 36 is normally biased for conduction by the positive potential on lead 26 in the absence of inhibit pulses. The other three transistors of the two NOR gates are normally nonconducting in the absence of pulses at their respective base electrodes. Recirculating pulses in the deltic loop control the conduction of transistor 12' and input pulses from the source 32 control the conduction of transistor 33.

Figure 3:
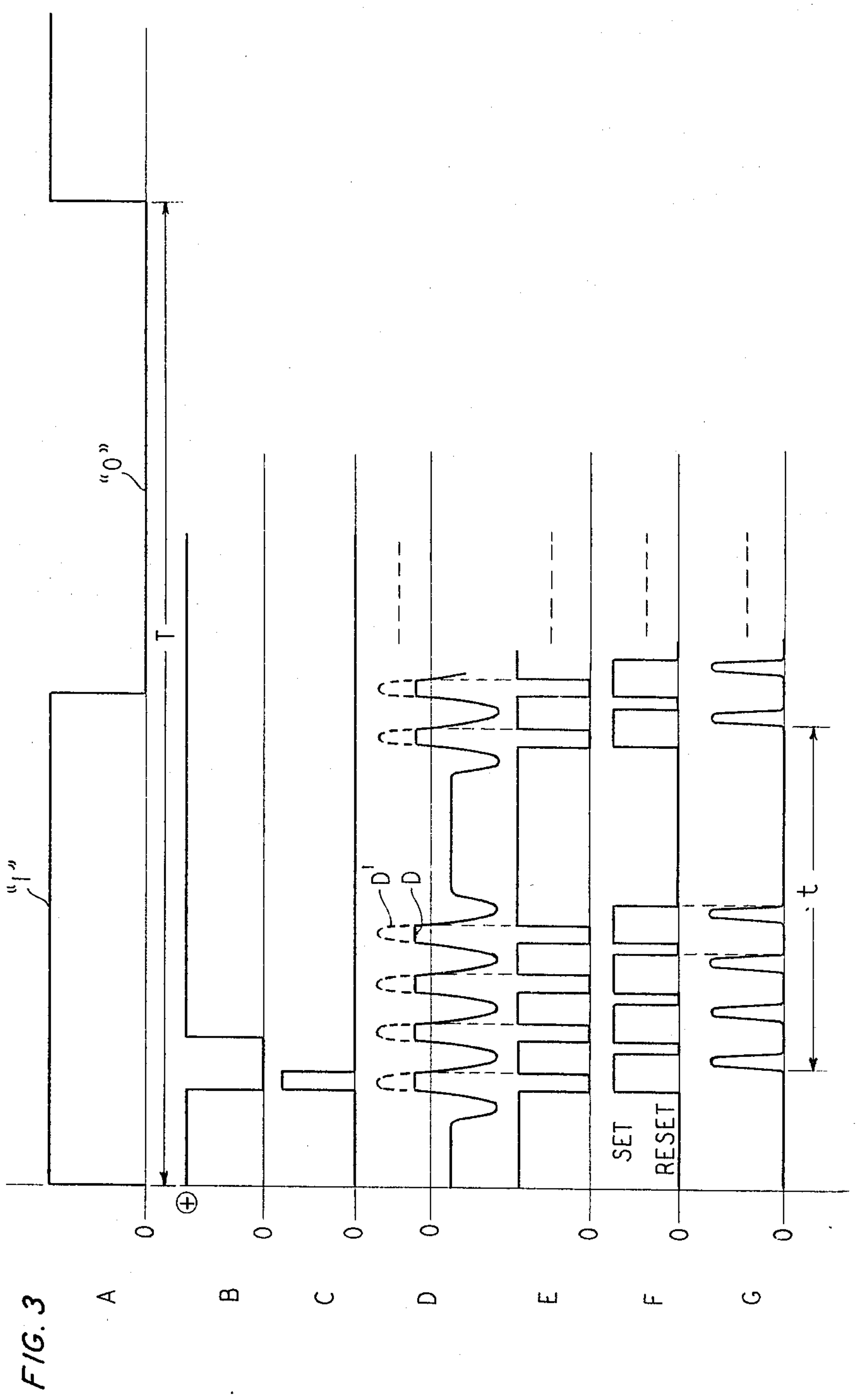

The input voltage signals from source 32 comprise a train of positive pulses as shown in FIG. 3A. FIGS. 3B through 3G comprise additional voltage waveforms of signals at different points in the deltic circuit and are illustrated on a different time scale than are the pulses of the wave A. Dimension lines in FIGS. 3A and 3G illustrate the difference in the time scale for the interval T of FIG. 3A and the corresponding interval t in FIGS. 3B through 3G. In common time units $T \gg t$; and $$\frac{T}{t} = N$$

where N is the time compression ratio of the deltic. The interval T includes, for example, a binary ONE followed by a binary ZERO signal in a train of binary coded signal pulses. The waves of FIGS. 3A through 3G are not shown to an exact scale but are simply indicated generally to illustrate the circuit operation. The horizontal axis indicated for each waveform represents ground potential.

The application of a negative-going inhibit pulse of FIG. 3B biases transistor 36 in FIG. 2 to a nonconducting condition and thereby leaves control of the deltic loop to the input signals of FIG. 3A. In other words, when transistor 36 is held in its nonconducting condition, the set input lead 39 for the gate binary 37 floats off ground and holds the binary circuit nonresponsive, in the absence of input signals from source 32, to any signals that may be applied to transistors 12' and 38. However, during each binary ONE pulse in FIG. 3A which occurs while transistor 36 is disabled, recirculating pulses in the deltic loop which appear at the base electrode of transistor 12' are coupled to lead 39. Each such pulse on lead 39 sets the gate binary 37 if it is not already in its set condition. The positive sampling pulse that occurs on lead 27 during the initial part of each inhibit pulse is provided to assure that at such sampling time the signal coupled to lead 39 is a sample of the signal from source 32 regardless of the nature of the circulating signals applied to threshold circuit 15.

In the absence of inhibit pulses, transistor 36 is continuously enabled for conduction and transistor 38 is nonconducting because sampling pulses of FIG. 3C are also absent whenever inhibit pulses are absent. Thus, control of setting signals for the gate binary 37 is exercised by the recirculating signals applied to the threshold circuit 15. The recirculated signals produced by amplifier 10' have generally the configuration of the wave of FIG. 3D, and those signals appear between resistor $R_s$ and capacitor 11. If amplifier 10 were a zero-output impedance source, and $R_s$ a separate resistance in the circuit, the broken-line wave marked D' in FIG. 3D would appear in the output of amplifier 10' in FIG. 2. It will be noted that in FIG. 3D there are many more pulses applied to the threshold circuit 15 from amplifier 10' than there are sampling pulses applied in FIG. 3C from lead 28. The additional pulses represent other samples circulating in the deltic loop circuit at the clocking rate, indicated in FIG. 3G, and which had been inserted in the loop by previous sampling pulses (not shown). The pulses of FIG. 3D are the tripolar pulses mentioned in connection with FIG. 1, and adjacent negative-going peaks of successive pulses are merged together.

Gate binary 37 is a time buffer circuit which accomplishes a one-bit storage function to retain sample pulse information applied to lead 39 until the next-occurring clock pulse appears. Thus, a positive sample pulse, either recirculating or newly applied from source 32, produces a negative-going pulse on lead 39 that sets the gate binary 37. The configuration of the signals applied to lead 39 is illustrated in FIG. 3E.

The output from the binary 37 appears on a lead 40 in the form illustrated in FIG. 3F and enables a clock gate 41. The next-occurring clock pulse on lead 28 is coupled through gate 41 to a lead 42 to reset the gate binary 37. The waveform on lead 42 is shown in FIG. 3G. The same clock gate output pulse also appears on lead 43 which is coupled to any suitable deltic utilization circuit 46. The same output signal on lead 43 is also coupled to a second input path transducer of the delay 30, and after transmission through the delay path 30'' therein it is coupled through the corresponding output transducer and the lead 47 to the input of an amplifier 10'.

Each of the paths 30' and 30'' in the delay 30 is advantageously of the same length as the other, and that length corresponds to a delay time which is equal to one clock signal period greater than or less than one input signal period, in accordance with well known deltic practice. In one embodiment which was operated the delay material was glass, the clock frequency was 25 megacycles per second, and the input signal sampling frequency (FIG. 3C) was 15.8 kilocycles per second.

The amplifier 10' in FIG. 2 corresponds to the pulse source 10 of FIG. 1 in that it provides pulses to the self-biased threshold circuit 15 of the deltic loop. This amplifier advantageously has a gain characteristic which is substantially independent of input signal magnitude in the amplitude range of input signals anticipated on lead 47. In other words, amplifier 10' provides the required gain but does not include the additional complication of an automatic gain control circuit which would alter the amplifier gain to compensate for any tendency toward variations in the input signal amplitude. Threshold circuit 15 base-clips and limits the pulses received from amplifier 10' in the manner already described in connection with FIG. 1 to stabilize both the leading edge occurence time and the amplitude of pulses applied to lead 39. The time stabilization is further discussed in connection with FIGS. 4A through 5B.

Figure 4B:
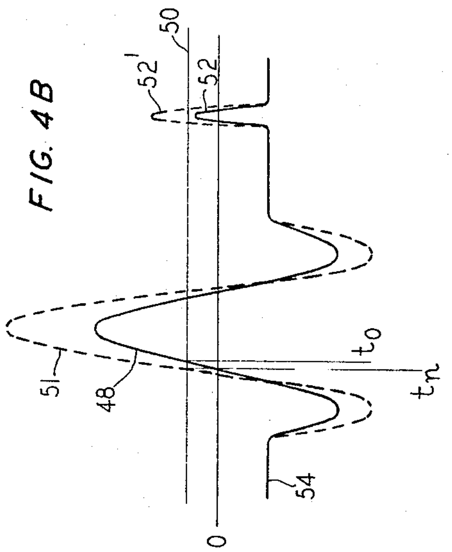
Figure 5B:
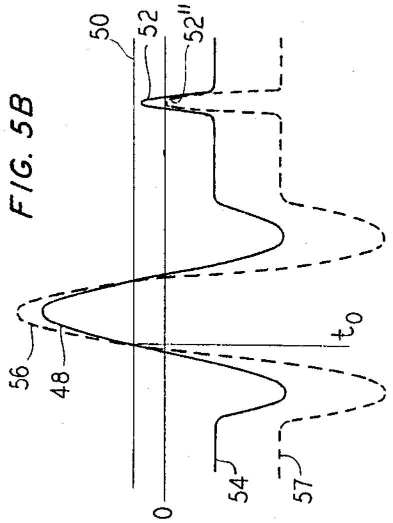
Figure 4A:
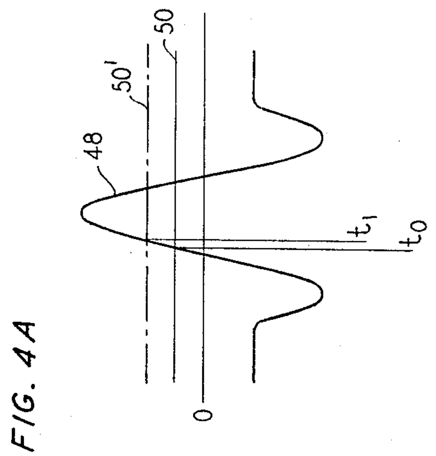

A pulse wave 48 is illustrated in each of the FIGS. 4A through 5B together with an indicated threshold voltage level 50. Pulse 48 is a circulating sample pulse in the output of a deltic delay means, and voltage 50 is the loop threshold clipping level used for excluding noise skirts. The time scale of abscissas has been radically expanded and the voltage scale of ordinates restricted in order to illustrate better the time jitter action hereinbefore mentioned. The zero reference for each waveform is arbitrarily located to be as shown in FIG. 3D in order to facilitate the consideration of the waveforms. The pulse 48 in FIGS. 4A and 4B is assumed to be in an automatic gain controlled prior art deltic loop. The wave portions in FIGS. 5A and 5B are assumed to be in a deltic loop, such as in FIG. 2, with no automatic gain control and which utilizes a self-biased threshold circuit.

Now considering first the oscillation wave 48 in FIG. 4, which is the product of a loop including an automatic gain controlled amplifier, it will be assumed that some change in conditions, e.g., ambient temperature at the loop location, occurs so that the threshold of operation of the fixed voltage threshold device normally used in such loops changes. In this case it is assumed that the temperature change caused an increase in the threshold voltage characteristic of such device from the level 50 to a threshold voltage level 50'. It can then be seen that whereas the input signal to the time buffer circuit for clipping at level 50 would begin at time $t_0$, the temperature-affected threshold 50' causes the same input signal to be withheld until the time $t_1$. Similarly, a reduction in the threshold characteristic of the fixed voltage threshold device used in the prior art circuits would cause the time buffer input samples to be begun at an earlier time not shown.

In a similar manner in FIG. 4B, a change in gain due perhaps to some change in the automatic gain control of the prior art deltic amplifier would result in a change in the signal amplitude with respect to the threshold 50 to produce time jitter. Such gain-controlled circuits characteristically permit signals to change with respect to the average level 54 of the signal. FIG. 4B shows the larger form of pulse 48 as the broken-line pulse wave 51 superimposed upon the wave 48. The time jitter in this application is evident because the wave 51 crosses the threshold 50 at a time $t_n$ which occurs before the time $t_0$ at which the wave 48 crosses the threshold 50. The same automatic gain control effect which produced wave 51 would also cause enlargement, in the same ratio, of a noise pulse 52 which was below the threshold 50. The enlarged noise pulse has the form 52' which exceeds the threshold 50 and thereby produces an erroneous operation of the deltic loop.

In deltic loops which require a high deltic loop clock rate, the tolerable misalignment range which can be accommodated by a time buffer circuit is considerably restricted. It has been found that such circuits in the prior art do not tolerate substantial time jitter of the type described in connection with the wave 48 of FIGS. 4A and 4B; and consequently operation breaks down due to the loss of bits in the reshaping and reclocking operations.

The aforementioned type of breakdown is avoided in the self-biased threshold arrangements described herein because of the unique manner in which the amplitude limiting function and the thresholding function have been combined to give a deltic loop circuit greater flexibility of operation. This is hereinafter illustrated in greater detail in connection with FIGS. 5A and 5B which present the same cases for a self-biased threshold arrangement as were previously discussed in connection with FIGS. 4A and 4B, respectively, for the prior art automatic gain control circuits.

Figure 5A:
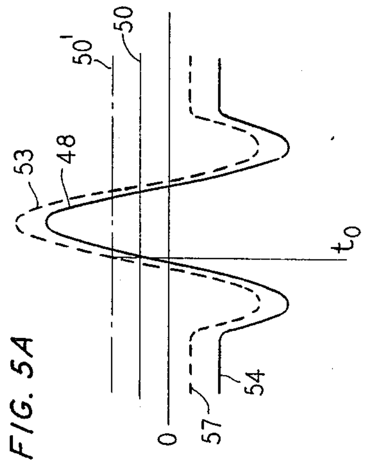

In FIG. 5A the same initial signal pulse 48 and threshold level 50 are illustrated. In this case the factor which caused the threshold to rise from the level 50 to the level 50' in FIG. 4A causes a similar change in FIG. 5A. Thus, assume that a temperature change causes a change in the characteristics of transistor 12' in FIG. 2 so that a larger base-emitter voltage is required for turn-on. Each increment of the change causes the transistor to conduct for a somewhat shorter time and to be off for a longer time thereby reducing the average charge on capacitor 11. The charge change results in a compensating level shift in the effective input signal to restore the charge-discharge equilibrium fixed by the previously discussed ratio $$\frac{R_s}{R_s+R}$$

The level shifting thus automatically accomplished by the self-biased threshold circuit is indicated by the broken-line pulse waveform 53 in FIG. 5A. Consequently, the thresholding device, transistor 12', continues to be effective at substantially the same percentage down from the pulse peak, with reference to the average level 57 of the wave, in both cases; and there is no time jitter.

It is now assumed in connection with wave 48 in FIG. 5B that some factor, such as temperature influence on the attenuation characteristic of the delay 30 of the loop, causes the output pulses from the delay 30 to have a larger amplitude corresponding to the increased signal amplitude in FIG. 4B. Such amplitude change in FIG. 5B is indicated by the broken-line wave 56. An automatic gain control could take over to pull the waveform back to the configuration of the wave 48, but the relatively inexpensive and simple self-biased threshold circuit in FIG. 1 operates independently of such signal variations and thus does not require an automatic gain control. The present self-biased threshold circuit is adapted as previously described to maintain an equilibrium condition in which the pulse 56 is clipped at approximately the same percentage down from its peak excursion as the wave 48 had been clipped, the percentage being determined for the wave by the resistance ratio $$\frac{R_s}{R_s+R}$$

Both the positive-going and negative-going pulse portions of pulse 56 are increased in size with respect to voltage level 50. The net effect on the voltage level 50 with respect to ground at which transistor 12' is turned on is zero, but that same voltage level with respect to the average value 57 of pulse 56 is still approximately the same percentage down from the peak of pulse 56. The time at which the waves 48 and 56 cross the voltage level 50 remains the same, i.e., $t_0$, so the pulse amplitude change produces no time jitter in the time when transistor 12' is turned on. Thus, no time jitter is evident in the input to the gate binary 37 of FIG. 2. Since the pulse changes represented by pulse 56 were effective with respect to the threshold level 50 instead of the average value of the pulse, the resulting noise pulse 52'' is further removed from threshold 50 than is noise pulse 52. Thus, the circuit designer can safely rely upon his design misalignment margin for the clock pulses with respect to the operation of the gate binary and be assured that no pulses in the wave of FIG 3G, on lead 43, will be lost or distorted.

Although the present invention has been described in connection with a particular embodiment and application thereof, it is to be understood that additional embodiments and applications which will be apparent to those skilled in the art are included within the spirit and scope of the invention.

What is claimed is:

1. A delay line time compressor comprising
means receiving input signal pulses,
delay means including plural signal transmission paths through a common delay medium,
an amplifier connected to an output of a first one of said paths for amplifying signal pulses received therefrom with a gain which is substantially independent of the amplitudes of such pulses,
means gating to an input of said first path signal pulses in an output of said amplifier at a first pulse rate and for gating to the same delay path input pulses from said receiving means at a second pulse rate,
control means including means generating control signals, and a circuit loop for circulating said control signals through a second path of said delay means for synchronizing said generating means, and means applying at least a portion of said control signals to operate said gating means.

2. The delay line time compressor in accordance with claim 1 in which a self-biased threshold circuit couples the output of said amplifier to said gating means.

3. In combination, means receiving input signal pulses, an amplifier, means coupling said pulses from said receiving means to an input of said amplifier, output pulses from said amplifier being subject to pulse amplitude and occurrence time variations, means connected to said coupling means for inhibiting the coupling of said input pulses at predetermined intervals, and gating means coupling said output pulses from said amplifier to an input of said coupling means during said intervals to substitute said output pulses for a pulse from said receiving means, said gating means including means stabilizing the amplitude and occurrence time of said pulses so substituted.

4. The combination in accordance with claim 3 in which said gating means comprises means clipping the amplitude of said output pulses so that only those signal pulse portions in excess of predetermined voltage thresholds are transmitted to said coupling means, means adjusting the clipping threshold for said amplifier output pulses to be a predetermined percentage of the average peak amplitude of a plurality of such pulses, and means applying the output of said clipping means to the input of said coupling means.

5. The combination in accordance with claim 3 in which said coupling means, said amplifier and said gating means comprise a delay line time compressor, said coupling means comprises delay line storage means coupling pulses from said receiving means to an input of said amplifier, and said gating means comprises a transistor having base, emitter and collector electrodes and operable to a conducting condition in response to the application of a predetermined minimum potential difference between said base and emitter electrodes, a capacitor connected to couple said amplifier output pulses to said base and emitter electrodes, means including said capacitor biasing said transistor into a saturated conduction condition in response to a predetermined portion of each of said pulses to change the charge on said capacitor, said biasing means including resistance means shunting said base and emitter electrodes to provide a circuit for partially discharging said capacitor between intervals of conduction in said transistor, said resistance means and said capacitor being so proportioned that the time constant of said discharging circuit is much greater than the time interval between successive ones of said input signal pulses, and means coupling pulses at said collector electrode to an input of said delay line storage means.

6. The combination in accordance with claim 5 in which said resistance means comprises bias means for at least partially offsetting said predetermined minimum potential difference.

7. The combination in accordance with claim 5 in which said reference means includes a resistor and a diode connected in series between said base and emitter electrodes, and means biasing said diode in a conducting condition to develop a potential difference normally biasing said base electrode toward conduction.

References Cited by the Examiner

UNITED STATES PATENTS

| | | | |
|---|---|---|---|
| 2,961,535 | 11/1960 | Lanning | 328—55 |
| 3,150,324 | 9/1964 | Hallden et al. | 328—56 |
| 3,223,981 | 12/1965 | Fischer | 328—55 X |

ARTHUR GAUSS, *Primary Examiner.*

J. ZAZWORSKY, *Assistant Examiner.*